United States Patent Office 3,079,375
Patented Feb. 26, 1963

3,079,375
METALLIZABLE AND METALLIZED AZO DYE-
STUFFS FOR ACRYLONITRILE POLYMERS
James M. Straley and Raymond C. Harris, Kingsport,
Tenn., assignors to Eastman Kodak Company, Rochester, N.Y., a corporation of New Jersey
No Drawing. Filed Sept. 29, 1960, Ser. No. 59,194
6 Claims. (Cl. 260—152)

This invention relates to new water insoluble azo compounds and their application to the art of dyeing or coloring. More particularly, it relates to certain metallized and non-metallized azo compounds and their application for the dyeing or coloring of acrylonitrile polymers, especially polyacrylonitrile textile materials.

The azo compounds of our invention consist of the water insoluble azo compounds, devoid of a water-solubilizing group, having the formula:

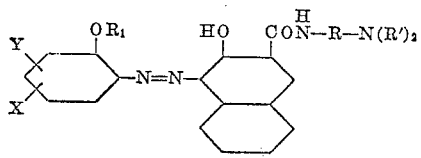

wherein R represents an alkylene radical selected from the group consisting of —$CH_2CH_2$—, —$CH_2CH_2CH_2$— and —$CH_2CHOHCH_2$—, R' represents an alkyl radical having 1 to 4 carbon atoms, $R_1$ represents a member selected from the group consisting of a hydrogen atom and a methyl radical, X represents a member selected from the group consisting of a hydrogen atom, a methyl radical, a nitro group, a chlorine atom, a bromine atom, a methylsulfonyl group, an ethylsulfonyl group, a trifluoromethyl group and a —$SO_2N(Q)_2$ group, wherein Q represents a member selected from the group consisting of a hydrogen atom and an alkyl radical having 1 to 4 carbon atoms, wherein Y may be a methoxy group when X is a —$SO_2N(Q)_2$ group, and wherein $N(R')_2$ collectively represents a member selected from the group consisting of a morpholinyl radical and a piperidyl radical and the metal complexes containing a metal selected from the group consisting of chromium, cobalt, copper and nickel of said water insoluble azo compounds.

The water insoluble non-metallized azo compounds of our invention are prepared by diazotizing a primary arylamine having the formula:

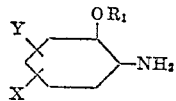

wherein $R_1$, X and Y have the meaning previously assigned to them and coupling the diazonium compound obtained with a naphthalene compound having the formula:

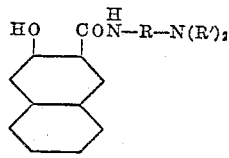

wherein R, R' and $N(R')_2$ have the meaning previously assigned to them. The metallized azo compounds of our invention are prepared by metallizing the non-metallized azo compounds with appropriate metallizing agents in accordance with known metallizing procedures. The manner in which metallization can be carried out is fully described hereinafter.

Nickel chloride, nickel bromide, nickel sulfate, nickel acetate, nickel formate, nickel thiocyanate [$Ni(SCN)_2$], cobaltous bromide, cobaltic chloride, cobaltous chloride, cobaltous acetate, cobalt thiocyanate [$Co(SCN)_2$], chromium trichloride, chromium tribromide, chromic sulfate, chromic acetate, chromium thiocyanate [$Cr(SCN)_3$], cupric chloride, cupric bromide, cupric acetate and cupric lactate, for example, are illustrative of the metallizing agents that can be employed.

Both the non-metallized and the metallized azo compounds of our invention can be applied to polyacrylonitrile textile materials in the form of an aqueous dispersion. Coloration can also be effected by incorporating the non-metallized or metallized azo compounds into the spinning composition, melt spinning the fiber as usual and converting the non-metallized azo compounds to their metallized form if desired. Also the metallizing agent can be incorporated in the spinning composition, the fiber melt spun as usual and then treated in a dyebath containing one or more of the non-metallized azo compounds to form the metal complex on the fiber.

The non-metallized azo compounds yield scarlet to red shades on polyacrylonitrile materials. The metallized compounds yield violet to red shades on polyacrylonitrile materials, such as acrylic fibers, which have good fastness to light, gas, washing and sublimation. The metallized dyeings have better fastness to washing than the corresponding non-metallized dyeings and frequently have improved fastness to light.

Ordinarily, the polyacrylonitrile material is a textile material in fiber, filament, yarn or cloth form, for example. However, the polyacrylonitrile can be, for example, in sheet or film form. Among the acrylinitrile polymers that can be dyed or colored with the non-metallized and metallized azo compounds of our invention are those disclosed in Straley and Giles U.S. Patent 2,857,372, issued October 21, 1958.

2-amino-4-nitrophenol,
2-amino-5-nitrophenol,
2-amino-4-chlorophenol,
2-amino-4-bromophenol,
2-amino-4-trifluoromethylphenol,
2-amino-4-methylphenol,
2-amino-4-methylsulfonylphenol,
2-amino-4-ethylsulfonylphenol,
o-aminophenol,
o-anisidine,
2,5-dimethoxyaniline,
2-methoxy-5-chloroaniline,
2-methoxy-5-bromoaniline,
2-methoxy-4-nitroaniline,
2-methoxy-5-trifluoromethylaniline,
2-methoxy-5-methylsulfonylaniline,
2-methoxy-5-ethylsulfonylaniline,
1-amino-2-methoxy-5-N-methylsulfonamidobenzene,
1-amino-2-methoxy-5-N,N-dimethylsulfonamidobenzene, 1-amino-2-methoxy-5-N-ethylsulfonamidobenzene,
1-amino-2-methoxy-5-N,N-diethylsulfonamidobenzene,
1-amino-2-methoxy-5-N-n-propylsulfonamidobenzene,
1-amino-2-methoxy-5-N-isopropylsulfonamidobenzene,
1-amino-2-methoxy-5-N-n-butylsulfonamidobenzene,
1-amino-2-methoxy-5-N,N-n-dibutylsulfonamidobenzene,
1-amino-2,5-dimethoxy-4-N-methylsulfonamidobenzene,
1-amino-2,5-dimethoxy-4-N-ethysulfonamidobenzene,
3-amino-4-hydroxybenzenesulfonamide and
3-amino-4-methoxybenzenesulfonamide are illustrative of the primary arylamines used in the preparation of the azo compounds of our invention.

2-hydroxy-3-N-($\beta$-dimethylaminoethyl)naphthamide,
2-hydroxy-3-N-($\beta$-diethylaminoethyl)naphthamide,
2-hydroxy-3-N-($\beta$-di-n-propylaminoethyl)naphthamide,
2-hydroxy-3-N-($\beta$-di-n-butylaminoethyl)naphthamide,
2-hydroxy-3-N-($\gamma$-dimethylaminopropyl)naphthamide,
2-hydroxy-3-N-($\gamma$-diethylaminopropyl)naphthamide,
2-hydroxy-3-N-($\gamma$-di-n-propylaminopropyl)naphthamide,
2-hydroxy-3-N-($\gamma$-di-n-butylaminopropyl)naphthamide,
2-hydroxy-3-N-($\beta$-morpholinylethyl)naphthamide,
2-hydroxy-3-N-($\gamma$-morpholinylpropyl)naphthamide,
2-hydroxy-3-N-($\beta$-piperidylethyl)naphthamide,
2-hydroxy-3-N-($\gamma$-piperidylpropyl)naphthamide,
2-hydroxy-3-N-($\gamma$-dimethylamino-$\beta$-hydroxypropyl)naphthamide,
2-hydroxy-3-N-($\gamma$-diethylamino-$\beta$-hydroxypropyl)naphthamide,
2-hydroxy-3-N-($\gamma$-di-n-butylamino-$\beta$-hydroxypropyl)naphthamide,
2-hydroxy-3-N-($\gamma$-piperidyl-$\beta$-hydroxypropyl)naphthamide, and
2-hydroxy-3-N-($\gamma$-morpholinyl-$\beta$-hydroxypropyl)naphthamide are illustrative of the coupling components used in preparing the azo dyestuffs of our invention.

The coupling components can be prepared by reacting 2-hydroxy-3-naphthoic acid chloride or 2-acetoxy-3-naphthoic acid chloride with an amine having the formula:

$$H_2N—R—N(R')_2$$

wherein R, R' and $N(R')_2$ have the meaning previously assigned to them. When 2-acetoxy-3-naphthoic acid chloride is employed the acetyl group is split off by known methods after the reaction with the amine is complete.

The following examples illustrate the invention.

Example 1

1.29 grams of 1-amino-2-methoxy-5-N,N-diethylsulfonamidobenzene was dissolved in 100 cc. of water and 2 cc. of concentrated hydrochloric acid by warming. 2.5 cc. of concentrated hydrochloric acid were added and then the reaction mixture was cooled to 0° C. and diazotized by adding, with stirring, an aqueous solution of 0.38 gram of sodium nitrite at 0° C. Stirring was continued for 1 hour at 0° C. after which excess nitrous acid present was destroyed by adding urea.

The diazonium solution obtained as described above was added, with stirring, at 0° C. to a solution of 1.3 grams of 2-hydroxy-3-N-($\gamma$-dimethylaminopropyl)naphthamide in 50 cc. of 2% acetic acid. The reaction mixture resulting was stirred for 1 hour at 0° C. and then neutralized by the addition of $Na_2CO_3$. The gel which formed was broken up by adding NaCl and warming. The dye compound that precipitated was recovered by filtration, washed well with water and air-dried. 2.23 grams of the dye compound having the formula:

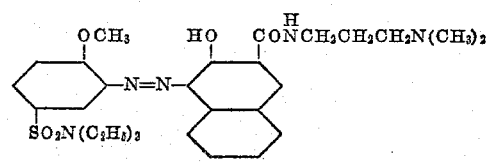

were obtained. It dyes polyacrylonitrile materials such as Verel and Orlon 42 acrylic fibers red shades. The nickel, cobalt, chromium and copper complexes thereof yield somewhat bluer dyeings which have good to excellent fastness to light, gas, washing and sublimation.

Example 2

5.4 grams of the non-metallized dye of Example 1 in finely divided condition were stirred into 120 cc. of water containing 0.5 gram of Igepal CA (a polymerized ethylene oxide-alkylphenol condensation product). 2.5 grams of nickel acetate, $Ni(OOCCH_3)_2 \cdot 4H_2O$, were added and the reaction mixture was brought to the boil and held at the boil until all the dye was dissolved. The reaction mixture was then cooled, neutralized with $Na_2CO_3$ and NaCl was added to complete precipitation of the dye. The nickel complex of the dye of Example 1 was recovered by filtration, washed with a 10% aqueous sodium chloride solution and air-dried. The product is a reddish brown powder. It yields fast red dyeings on polyacrylonitrile textile materials.

Example 3

1.15 grams of 1-amino-2-methoxy-5-N,N-dimethylsulfonamidobenzene was diazotized and the diazonium compound obtained was coupled with 1.39 grams of 2-hydroxy-3-N-($\beta$-diethylaminoethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers red shades. When the dye compound of this example is applied to a polyacrylonitrile textile fabric and converted to its nickel, cobalt, chromium or copper complex, red dyeings which have good to excellent fastness to light, gas, washing and sublimation are obtained.

Example 4

1.29 grams of 1-amino-2-methoxy-5-N-n-butylsulfonamidobenzene was diazotized and the diazonium compound obtained was coupled with 1.51 grams of 2-hydroxy-3-N-($\beta$-morpholinylethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers red shades. When the dye compound of this example is applied to a polyacrylonitrile textile fabric and converted to its nickel, cobalt, chromium or copper complex, red dyeings which have good to excellent fastness to light, gas, washing and sublimation are obtained.

Example 5

0.67 gram of o-anisidine, 5 cc. of water and 1.1 cc. of concentrated hydrochloric acid were brought to the boil, 0.3 gram of charcoal was added and then the reaction mixture was filtered. 2.25 cc. of concentrated hydrochloric acid were added to the filtrate which was then cooled to 0° C. 0.4 gram of sodium nitrite dissolved in 4 cc. of water was introduced below the surface at a temperature below 5° C. Upon completion of the diazotization reaction which took place (about 15 minutes) excess nitrous acid was destroyed by adding urea (sulfamic acid can also be used).

The diazonium solution prepared as described above was added, with stirring, to a solution of 1.3 grams of 2-hydroxy-3-N-($\gamma$-dimethylaminopropyl)naphthamide in 12 cc. of 10% aqueous acetic acid below 5° C. and stirring was continued for 1 hour longer at a temperature below 5° C. The mineral acid present was made neutral to Congo red by adding sodium acetate. The resulting reaction mixture was held below 5° C. for 1 hour and then allowed to come to room temperature and neutralized with soda ash. The dye compound which precipitated was recovered by filtration, washed with cold water and air-dried. The dye compound obtained dyes heated to 80° C. and then allowed to cool to room temperature. The metallized dye product which precipitated was recovered by filtration, washed with a 5% aqueous sodium chloride solution and air-dried. A yield of 2.5 grams of the metallized dye product was obtained. It dyes Verel and Orlon acrylic fibers fast red shades.

*Example 14*

7.7 grams of 2-amino-5-nitrophenol were diazotized and the diazonium compound obtained was coupled with 15 grams of 2-hydroxy-3-N-(β-diethylaminoethyl)naphthamide. Diazotization, coupling and recovery of the dye compound formed were carried out in accordance with the procedure described in Example 12. The dye compound obtaind colors polyacrylonitrile materials, such as Verel and Orlon 42 acrylic fibers, red shades.

When the dye compound of this example is applied to a polyacrylonitrile textile fabric and converted to its nickel, cobalt, chromium or copper complex, violet dyeings which have good to excellent fastness to light, gas, washing and sublimation are obtained.

*Example 15*

A nitrosylsulfuric acid solution was prepared from 3.1 grams of sodium nitrite and 20 cc. of 96% sulfuric acid, cooled and added to 40 cc. of propionic-acetic (1:5) acid below 10° C. A solution of 4.96 grams of picramic acid in 40 cc. of propionic-acetic (1:5) acid was stirred in at 0° C. The diazotization reaction which takes place was continued for 2½ hours maintaining a temperature below 5° C. The diazonium solution thus obtained was added with stirring to a solution of 8.9 grams of 2-hydroxy-3-N-(β-dimethylaminoethyl)naphthamide in 60 cc. of propionic-acetic (1:5) acid below 5° C. The reaction mixture resulting was stirred for one hour and then poured onto 350 grams of crushed ice and neutralized with ammonium hydroxide. The dye product which precipitated was recovered by filtration, washed with cold water and air-dried. The dye compound thus obtained colors polyacrylonitrile materials, such as Verel and Orlon 42 acrylic fibers, orange shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 16*

1.23 grams of 1-amino-2,5-dimethoxy-4-N-methylsulfonamidobenzene was diazotized and the diazonium compound obtained was coupled with 1.3 grams of 2-hydroxy-3-N-(γ - dimethylaminopropyl)naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, bluish-red shades. Metallization of these dyed fibers with nickel thiocyanate or cobalt thiocyanate produces fast red-violet shades. Generally similar fast shades are also obtained when the fibers are metallized with an appropriate chromium or copper metallizing agent.

*Example 17.—Metalization With Copper*

2.03 grams of the nonmetallized dye of Example 5, 1.24 grams of Cu(NO$_3$)$_2$·3H$_2$O, 0.26 gram of Na$_2$CO$_3$ and 20 cc. of methyl Cellosolve were brought to gentle reflux and held at refluxing temperature for 4 hours. The reaction mixture was then cooled and poured into 400 cc. of water after which 100 cc. of a saturated aqueous sodium chloride solution was added. The gummy solid which precipitated was isolated by decantation and dissolved in 600 cc. of warm water. 100 cc. of a saturated aqueous sodium chloride solution was added and after cooling to 10° C. the solid was again isolated by decantation. The solid thus obtained was dissolved in 400 cc. of water and a 10% aqueous solution of potassium iodide was added until no more precipitate formed. The precipitate was recovered by filtration, washed with cold water and air-dried. The metallized dye product thus obtained dyes polyacrylonitrile materials, such as Verel and Orlon 42 acrylic fibers, fast bluish-red shades.

*Example 18.—Metallization With Chromium*

8.12 grams of the dye compound of Example 5 and 10.8 grams of CrCl$_3$·6H$_2$O were dissolved in 100 cc. of ethylene glycol at 140° C. and held for one hour at this temperature. The reaction mixture thus obtained was cooled to 80° C. and then poured into 220 cc. of a 25% aqueous sodium chloride solution. The resulting reaction mixture was cooled to 5° C. and the reaction product was recovered by filtration and dried at 60° C. The product thus obtained was extracted with three 100 cc. portions of hot absolute ethyl alcohol and the alcohol was removed under vacuum to recover the metallized dye product. 7.9 grams of the chromium complex of the dye of Example 5 were obtained. It colors polyacrylonitrile materials, such as Verel and Orlon 42 acrylic fibers, fast violet shades.

*Example 19*

1.29 grams of N,N-diethyl-4-methoxy-3-aminobenzenesulfonamide was diazotized and the diazonium compound obtained was coupled with 1.44 grams of 2-hydroxy-3-N-(γ-dimethylamino-β-hydroxypropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers red shades. When the dye compound of this example is applied to a polyacrylonitrile textile fabric and converted to its nickel, cobalt, chromium and copper complex red dyeings which have good to excellent fastness to light, gas, washing and sublimation are obtained.

*Example 20*

0.67 gram of o-anisidine was diazotized and the diazonium compound obtained was coupled with 1.65 grams of 2-hydroxy-3-N-(γ-morpholinyl-β-hydroxypropyl)naphthamide. Diazotization, coupling and recovery of the dye compound formed were carried out in accordance with the procedure described in Example 5. The dye compound obtained dyes polyacrylonitrile materials such as Verel and Orlon 42 acrylic fibers red shades. When the dye compound of this example is applied to a polyacrylonitrile textile fabric and converted to its nickel, cobalt, chromium or copper complex red dyeings which have good to excellent fastness to light, gas, washing and sublimation are obtained.

*Example 21*

7.7 grams of 2-amino-5-nitrophenol were diazotized and the diazonium compound obtained was coupled with 16.4 grams of 2-hydroxy-3-N-(γ-piperidyl-β-hydroxypropyl)naphthamide. Diazotization, coupling and recovery of the dye compound formed were carried out in accordance with the procedure described in Example 12. The dye compound obtained dyes polyacrylonitrile materials such as Verel and Orlon 42 acrylic fibers red shades. When the dye compound of this example is applied to a polyacrylonitrile textile fabric and converted to its nickel, cobalt, chromium or copper complex red-violet dyeings which have good to excellent fastness to light, gas, washing and sublimation are obtained.

The following tabulation further illustrates the azo compounds of our invention and the colors they yield on acrylic fibers such as Verel and Orlon 42. The compounds were prepared by diazotizing the primary arylamines listed in the column entitled "Diazo Component" and coupling the diazonium compounds obtained with the "Coupling Components" indicated. Metallization was effected on the fiber with the corresponding metal thiopolyacrylonitrile materials such as Verel and Orlon 42 acrylic fibers red shades. When the dye compound of this example is applied to a polyacrylonitrile textile fabric and converted to its nickel, cobalt, chromium or copper complex, red dyeings which have good to excellent fastness to light, gas, washing and sublimation are obtained.

*Example 6*

0.765 gram of 2,5-dimethoxyaniline was diazotized and the diazonium compound obtained was coupled with 1.3 grams of 2 - hydroxy - 3 - N - ($\gamma$-dimethylaminopropyl) naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, red shades.

When the dye compound of this example is applied to a polyacrylonitrile textile fabric and converted to its nickel, cobalt, chromium or copper complex, reddish dyeings which have good to excellent fastness to light, gas, washing and sublimation are obtained.

*Example 7*

0.99 gram of 2-methoxy-5-chloroaniline was diazotized and the diazonium compound obtained was coupled with 1.5 grams of 2 - hydroxy-3-N-($\beta$ - diethylaminoethyl) naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, red shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 8*

0.84 gram of 2-methoxy-4-nitroaniline was diazotized and the diazonium compound obtained was coupled with 1.3 grams of 2 - hydroxy-3-N-($\gamma$ - dimethylaminopropyl) naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, scarlet shades. The nickel, cobalt, chromium and copper complexes thereof yield somewhat bluer dyeings which have good to excellent fastness to light, gas, washing and sublimation.

*Example 9*

0.96 gram of 2-methoxy-5-trifluoromethylaniline was diazotized and the diazonium compound obtained was coupled with 1.5 grams of 2-hydroxy-3-N-($\gamma$-diethylaminopropyl)naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, scarlet shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 10*

1.4 grams of 2-methoxy-5-methylsulfonylaniline was diazotized and the diazonium compound obtained was coupled with 1.6 grams of 2-hydroxy-3-N-($\gamma$-piperidylpropyl)naphthamide. Diazotization, coupling and recovery of the dye compound formed were carried out in accordance with the procedure described in Example 5. The dye compound obtained dyes polyacrylonitrile materials, such as Verel and Orlon 42 acrylic fibers, red shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 11*

Nitrosylsulfuric acid was prepared by adding 0.4 gram of sodium nitrite to 10 cc. of 96% sulfuric acid without cooling. The resulting solution was cooled and added to 20 cc. of propionic-acetic (1:5) acid at 0° C. A solution of 0.885 gram of 2-amino-4-trifluoromethylphenol in 20 cc. of propionic-acetic (1:5) acid was added, with stirring, at a temperature below 5° C. The reaction mixture resulting was maintained below 5° C. for one hour and then brought to a temperature of 10° C. over a period of one hour. The diazonium solution thus obtained was added, with stirring, to a solution of 1.3 grams of 2-hydroxy-3-N-($\gamma$-dimethylaminopropyl)naphthamide in 20 cc. of 10% aqueous acetic acid while maintaining a temperature below 5° C. The reaction mixture was stirred for one hour below 5° C. and then the mineral acid present was made neutral to Congo red by the addition of sodium acetate. The reaction mixture was stirred for an hour longer and allowed to come to room temperature, after which it was neutralized with sodium carbonate. The dye compound which precipitated was recovered by filtration, washed with cold water and air-dried. The dye compound thus obtained dyes polyacrylonitrile materials, such as Verel and Orlon 42 acrylic fibers, red shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 12*

7.7 grams of 2-amino-4-nitrophenol were dissolved by warming in 75 cc. of water and 10 cc. of concentrated hydrochloric acid. 20 cc. of concentrated hydrochloric acid were then added and the reaction mixture was cooled to 0° C. by the addition of crushed ice. The 2-amino-4-nitrophenol was diazotized by the addition of 3.5 grams of sodium nitrite dissolved in 10 cc. of water. The reaction mixture was stirred for one hour longer while maintaining the temperature below 5° C.

The diazonium solution prepared as described above was added with stirring to a solution of 14 grams of 2-hydroxy - 3 - N-($\gamma$-dimethylaminopropyl)naphthamide in 250 cc. of water and 10 cc. of glacial acetic acid, cooled to a temperature of 0° C. by the addition of ice. The diazonium solution was added over a period of 30 minutes while maintaining the temperature of the reaction mixture at 0° C. The reaction mixture was stirred an additional 30 minutes after the addition of the diazonium solution and then neutralized by the addition of sodium carbonate. The dye compound which precipitated was recovered by filtration, washed with cold water and air-dried. The dye compound thus obtained dyes polyacrylonitrile materials, such as Verel and Orlon 42 acrylic fibers, red shades.

When the dye compound of this example is applied to a polyacrylonitrile textile fabric and converted to its nickel, cobalt, chromium or copper complex, red dyeings which have good to excellent fastness to light, gas, washing and sublimation are obtained.

*Example 13*

2.2 grams of the dye compound of Example 12, 30 cc. of acetone and 4 cc. of 28% aqueous ammonium hydroxide were brought to reflux and a solution of 1.4 grams of nickel acetate, $Ni(OOCCH_3)_2 \cdot 4H_2O$, in 30 cc. of 50% aqueous acetone was gradually added. The reaction mixture resulting was refluxed for 2½ hours and then poured into 800 cc. of water. 40 grams of sodium chloride were added after which the reaction mixture was cyanates. "Original" refers to the colors yielded by the non-metallized dye compounds while "Final" refers to the colors yielded by the metallized dye compounds.

| Diazo Component | Coupling Component | Metal | Color | |
|---|---|---|---|---|
| | | | Original | Final |
| 2-amino-4-chlorophenol. | 2-hydroxy-3-N-(γ-di-methylaminopropyl)-naphthamide. | Nickel | Red | Red. |
| Do | ----do---- | Cobalt | ---do--- | Do. |
| 3-amino-4-hydroxybenzene-sulfonamide. | ----do---- | Nickel | ---do--- | Do. |
| 3-amino-4-methoxybenzene-sulfonamide. | ----do---- | ---do--- | ---do--- | Do. |
| 2-amino-4-methylsulfonylphenol. | 2-hydroxy-3-N-(γ-dimethylaminoethyl)-naphthamide. | ---do--- | ---do--- | Do. |
| 2-amino-4-methylsulfonylphenol. | ----do---- | Cobalt | ---do--- | Do. |
| 2-amino-4-methylphenol. | 2-hydroxy-3-N-(γ-di-n-propylaminopropyl)-naphthamide. | Nickel | Orange | Do. |
| Do | ----do---- | Cobalt | ---do--- | Do. |
| 2-amino-4-nitrophenol. | 2-hydroxy-3-N-(γ-morpholinylpropyl)-naphthamide. | Nickel | Red | Do. |
| Do | ----do---- | Cobalt | ---do--- | Do. |
| Do | 2-hydroxy-3-N-(γ-piperidylpropyl) naphthamide. | Nickel | ---do--- | Do. |
| Do | ----do---- | Cobalt | ---do--- | Do. |

The chromium and copper complexes of the non-metallized azo compounds of the foregoing tabulation yield about the same colors on acrylic fibers as do the nickel and cobalt complexes.

*Example 22*

188 grams of 2-hydroxy-3-naphthoic acid were slurried in 1000 cc. of dry benzene. A solution of 122 grams of $SOCl_2$ in 500 cc. of dry benzene was added over a period of 30 to 45 minutes. The reaction mixture resulting was stirred for 2.5 hours at room temperature, then raised slowly to 60° C. and held at this temperature until a clear solution resulted (about 2 hours). The excess $SOCl_2$, $SO_2$ and HCl was removed under vacuum while keeping the pot temperature at 60° C. or below. The last traces of $SOCl_2$, $SO_2$ and HCl were removed by passing a slow stream of dry air through the reaction mixture for about 15 minutes. The reaction mixture was cooled to 25° C. and 138 grams of anhydrous $K_2CO_3$ were added, after which a solution of 110 grams of 3-dimethylaminopropylamine in 300 cc. of dry benzene was added dropwise while keeping the pot temperature at 60° C. or below. The reaction mixture was stirred 6 hours longer at room temperature, then raised to 65° C. and filtered hot. The material collected on the filter was washed with three 2-liter portions of hot benzene. The combined filtrates were concentrated under vacuum to 1/3 their volume below 70° C. The reaction mixture was cooled to room temperature. The desired product which precipitated was recovered by filtration. A yield of 240 grams of 2-hydroxy-3-N-(γ-dimethylaminopropyl)-naphthamide melting at 143° C. to 145° C. was obtained.

*Example 23*

Example 22 was repeated using 155 grams of γ-morpholinylpropylamine in place of 3-dimethylaminopropylamine. 2-hydroxy-3-N - (γ - morpholinylpropyl)naphthamide having a melting point of 131° C. to 135° C. was obtained.

*Example 24*

Example 22 was repeated using 152 grams of γ-piperidylpropylamine in place of 3-dimethylaminopropylamine. 2-hydroxy-3-N - (γ-piperidylpropyl)naphthamide having a melting point of 140 to 144° C. was obtained.

*Example 25*

29 cc. of 3-diethylamino-2-hydroxypropylamine in 50 cc. of dry benzene were added dropwise, with vigorous agitation, over a period of 1 hour to a solution of 20.65 grams of 2-hydroxy-3-naphthoyl chloride in 100 cc. of dry benzene at 70° C. When the addition was complete the temperature of the reaction mixture was raised to 80 to 85° C. and stirring was continued for one hour. The reaction mixture was then allowed to cool to 25° C. and the lumpy precipitate was ground under the mother liquor. The solid reaction product was allowed to settle and then the liquid layer was removed by decantation. The crude reaction product was dried 6 hours in a 60° C. oven then dispersed in 5 liters of water containing 150 cc. of concentrated hydrochloric acid. The temperature was raised to 80° C. and the mixture stirred at this temperature for 30 minutes. Any suspended solids were then removed by gravity filtration and the filtrate was made basic with an aqueous solution of sodium bicarbonate. The purified reaction product was recovered by filtration, washed well with water and dried at 60° C. 20 grams of 2-hydroxy-3-N-(γ-diethylamino-2-hydroxypropyl)naphthamide melting at 170° C. to 175° C. were thus obtained.

Following the general procedure described in the examples just given the other naphthamide coupling components are readily prepared. Many of the naphthamide coupling components employed in the preparation of the new azo compounds of our invention tend to be obtained as sticky solids.

The primary amines having the formula:

$$H_2N—R—N(R')_2$$

used in preparing the naphthamide compounds employed in the preparation of the azo compounds of our invention appear to include new as well as old compounds. Many of these amines are specifically disclosed in the prior art. Those not specifically disclosed can be prepared by the methods used to prepare the known compounds. 3-dimethylaminopropylamine is an article of commerce.

Three general processes by which primary amines having the formula:

$$H_2N—R—N(R')_2$$

can be prepared are set forth hereinafter.

(1) An amine having the formula:

$$H_2N(R')_2$$

is condensed with a chloroalkylnitrile having the formula: $Cl(CH_2)_xCN$, and the product obtained is reduced by sodium-alcohol or with hydrogen over Raney nickel to give the desired product:

$$H_2N(CH_2)_{x+1}N(R')_2$$

(2) Potassium phthalimide is condensed with a dibromoalkyl compound having the formula: $Br(CH_2)_zBr$ to obtain $C_6H_4(CO)_2N(CH_2)_z Br$ which is treated with an amine having the formula $H_2N(R')_2$ to give $$C_6H_4(CO)_2N(CH_2)_zN(R')_2$$

which is hydrolyzed with dilute mineral acid to give $H_2N(CH_2)_zN(R')_2$ the desired product. Method 2 is the well-known Gabriel synthesis.

(3) A secondary amine is added to an unsaturated nitrile, e.g. methacrylonitrile, and the product is hydrogenated to the desired primary amine.

$$(R')_2NCH_2\overset{|}{\underset{CH_3}{C}}HCN \longrightarrow (R')_2NCH_2\overset{|}{\underset{CH_3}{C}}HCH_2NH_2$$

$$H_2NCH_2\overset{CH_3}{\underset{|}{C}}HCH_2N(CH_3)_2 \text{ and } H_2NCH_2\overset{CH_3}{\underset{|}{C}}HCH_2N(C_2H_5)_2$$

for example can be readily prepared by method 3 by reacting dimethylamine and diethylamine, respectively, with methacrylonitrile and then hydrogenating the products obtained to their primary amine form.

R,R' and N(R')$_2$ as used herein have the meaning previously assigned to them, while $x$ is 1, 2 or 3 and $z$ is 2, 3 or 4.

Metallized dyeings are conveniently obtained by dyeing the polyacrylonitrile material with the non-metallized azo compounds and then metallizing. The following example illustrates one satisfactory way in which the non-metallized azo compounds can be metallized on the polyacrylonitrile material.

*Example 26*

A polyacrylonitrile textile fabric dyed red with a 1% dyeing (by weight of pure dye) of the non-metallized dye product of Example 1 was padded with a 3% aqueous solution of nickel thiocyanate under conditions such that a 60 to 100% pickup, based on the weight of the fabric, was obtained. The polyacrylonitrile fabric was then aged in a steam chest under 5 p.s.i. pressure for 10 minutes after which it was scoured at 60° C. with soap and water, rinsed well with warm water and dried. The polyacrylonitrile fabric was dyed a bluer shade of red having good fastness to light, gas, washing and sublimation.

By the use of a 3% aqueous solution of cobalt thiocyanate in place of nickel thiocyanate in Example 26 the corresponding cobalt complex of the non-metallized azo dye of Example 1 is obtained in situ on the textile fabric. Similarly, by the use of an equivalent amount of cobaltous acetate in place of nickel acetate in Examples 2 and 13 the cobalt complexes of the non-metallized azo compound of Examples 1 and 12, respectively, are obtained. They yield fast red dyeings on polyacrylonitrile textile materials.

The following example illustrates one satisfactory way in which the non-metallized azo compounds can be used to dye an acrylonitrile polymer textile material.

*Example 27*

0.1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with hot water and dried.

The premetallized azo dyes can be applied in the same general manner as the non-metallized azo dyes. However, in order to mitigate the possibility of demetallization during dyeing 5 cc. of a 5% aqueous solution of a weak acid such as boric acid is used instead of formic acid or acetic acid. Except for this change the dyeing conditions are the same.

Metallized dyeings can be obtained, for example, in accordance with the general procedure described in Example 26. This procedure is not limited to the use of a thiocyanate salt inasmuch as any of the metallizing agents named hereinbefore can be employed. However, we have found the use of the thiocyanates of nickel, cobalt and chromium to be very satisfactory. The use of a 3% aqueous solution of the metallizing agent is intended to be illustrative and not limitative. Weaker or stronger aqueous solutions can be employed.

The preparation and recovery of the metallized dye compounds off the fiber have been fully described hereinbefore.

The non-metallized and metallized azo compounds described herein are devoid of water-sobulizing groups such as the carboxylic acid and the sulfonic acid groups. Any other suitable methods known to the art can be used to apply them to acrylonitrile polymeric materials.

The invention has been described in detail with particular reference to preferred embodiments thereof, but it will be understood that variations and modifications can be effected within the spirit and scope of the invention as described hereinabove and as defined in the appended claims.

The expression "propionic-acetic (1:5) acid" refers to a mixture of propionic and acetic acids in which there are five parts by volume of acetic acid to one part by volume of propionic acid.

Analytical data indicate that the metal-dye complexes prepared off the cloth to consist of one atom of metal to two moles of dye.

We claim:

1. The water insoluble azo compounds selected from the group consisting of the water insoluble azo compounds, devoid of a water-solubilizing group, having the formula:

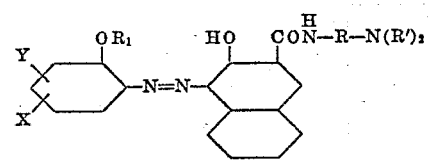

wherein R represents an alkylene radical selected from the group consisting of —CH$_2$CH$_2$—, —CH$_2$CH$_2$CH$_2$— and —CH$_2$CHOHCH$_2$—, R' represents an alkyl radical having 1 to 4 carbon atoms, R$_1$ represents a member selected from the group consisting of a hydrogen atom and a methyl radical, X represents a member selected from the group consisting of a hydrogen atom, a methyl radical, a nitro group, a chlorine atom, a bromine atom, a methylsulfonyl group, an ethylsulfonyl group, a trifluoromethyl group and a —SO$_2$N(Q)$_2$ group, wherein Q represents a member selected from the group consisting of a hydrogen atom and an alkyl radical having 1 to 4 carbon atoms, wherein Y may be a methoxy group when X is a —SO$_2$N(Q)$_2$ group, and wherein N(R')$_2$ collectively represents a member selected from the group consisting of a morpholinyl radical and a piperidyl radical and the metal complexes containing a metal selected from the group consisting of chromium, cobalt, copper and nickel of said water insoluble azo compounds.

2. The water insoluble azo compound having the formula:

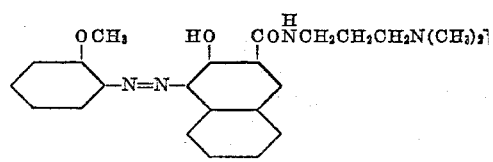

3. The water insoluble azo compound having the formula:

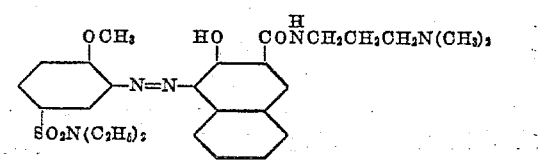

4. The water insoluble azo compound having the formula:
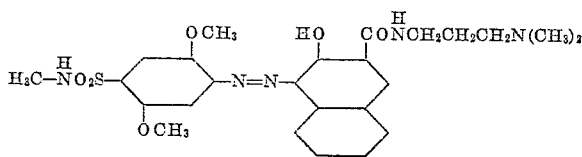
5. The water insoluble azo compound having the formula:
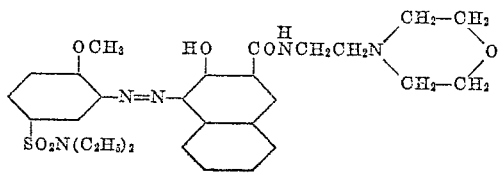
6. The water insoluble azo compound having the formula:
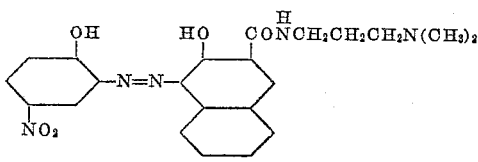
References Cited in the file of this patent
UNITED STATES PATENTS
| | | |
|---|---|---|
| 2,058,222 | Fischer | Oct. 20, 1936 |
| 2,128,255 | Krzikalla et al. | Aug. 30, 1938 |
| 2,233,038 | Sus et al. | Feb. 25, 1941 |
| 2,716,655 | Boyd | Aug. 30, 1955 |
| 2,968,661 | Straley et al. | Jan. 17, 1961 |
| 2,972,508 | Kruchenberg et al. | Feb. 21, 1961 |